United States Patent

De Graaf et al.

[11] Patent Number: 5,149,607
[45] Date of Patent: Sep. 22, 1992

[54] MATRIX

[75] Inventors: Matinus J. M. De Graaf; Herman C. Meinders, both of Eindhoven, Netherlands

[73] Assignee: U.S. Philips Corporation, New York, N.Y.

[21] Appl. No.: 597,961

[22] Filed: Oct. 12, 1990

Related U.S. Application Data

[63] Continuation-in-part of Ser. No. 474,319, Jan. 29, 1990, abandoned, which is a continuation of Ser. No. 827,576, Feb. 10, 1986, abandoned.

[30] Foreign Application Priority Data

Nov. 25, 1985 [NL] Netherlands ............. 8503234

[51] Int. Cl.⁵ .............................. B29D 17/00
[52] U.S. Cl. ...................... 430/17; 430/18; 430/321; 428/65; 264/1.4; 264/22; 264/226; 264/227
[58] Field of Search ............ 430/17, 18, 321; 428/65; 264/1.4, 22, 226, 227

[56] References Cited

U.S. PATENT DOCUMENTS

| 4,079,159 | 3/1978 | Sano et al. | 430/18 |
| 4,275,091 | 6/1981 | Lippits | 427/53.1 |
| 4,333,998 | 6/1982 | Leszyk | 430/140 |
| 4,482,511 | 11/1984 | Komatsubara | 264/22 |
| 4,500,629 | 2/1985 | Irving | 430/325 |
| 4,610,933 | 9/1986 | Van de Leest | 428/627 |
| 4,723,903 | 2/1988 | Okazaki | 425/385 |

FOREIGN PATENT DOCUMENTS 8102236 8/1981 PCT Int'l Appl. .

Primary Examiner—Marion E. McCamish
Assistant Examiner—Kathleen Duda
Attorney, Agent, or Firm—Norman N. Spain

[57] ABSTRACT

A matrix as shown in FIG. 3 and suitable for use in an injection molding process or a compressing molding process for the manufacture of optically readable information carriers comprising an optically readable information track, in which the matrix comprises a metal supporting plate 11 which on one side comprises a layer of a radiation-cured synthetic resin composition 8 comprising the negative of the information track.

5 Claims, 2 Drawing Sheets ions carriers are synthetic resin discs manufactured, for example, from polymethylmethacrylate (PMMA) or polycarbonate. The information track, which is provided in the surface of the disc, has a crenellated profile of information areas situated alternately at a higher level and at a lower level. The areas have small dimensions, for example, longitudinal dimensions varying from 0.3 to 3 μm. The difference in height between the areas is 0.1-0.2 μm. On the side of the information track the disc is covered by a reflection layer, for example a layer of Ag or Al. The track is read in reflection by means of a laser light beam. Reading is based on differences in phase in the reflected light dependent on whether an area situated at a higher level or an area situated at a lower level is irradiated.

MATRIX

RELATED APPLICATIONS

This application is a continuation-in-part of application Ser. No. 474,319, filed Jan. 29, 1990 now abandoned, said application Ser. No. 474,319 being a continuation of application Ser. No. 827,576, filed Feb. 10, 1986 and now abandoned.

BACKGROUND OF THE INVENTION

The invention relates to a matrix which is suitable for use in an injection molding process or a compression molding process for the manufacture of optically readable information carriers which comprise an optically readable information track.

The optically readable information carriers are synthetic resin discs manufactured, for example, from polymethylmethacrylate (PMMA) or polycarbonate. The information track, which is provided in the surface of the disc, has a crenellated profile of information areas situated alternately at a higher level and at a lower level. The areas have small dimensions, for example, longitudinal dimensions varying from 0.3 to 3 μm. The difference in height between the areas is 0.1-0.2 μm. On the side of the information track the disc is covered by a reflection layer, for example a layer of Ag or Al. The track is read in reflection by means of a laser light beam. Reading is based on differences in phase in the reflected light dependent on whether an area situated at a higher level or an area situated at a lower level is irradiated.

The discs are manufactured by using an injection molding process or a compression molding process in which a liquid synthetic resin composition is injected into a mold under pressure. In an injection molding pressure the liquid synthetic resin is injected in a mold which is already closed; in a compression molding process the mold is closed during or immediately after injection. One or two matrices are provided in the mold. The matrix has an information track which is the negative of the desired information track of the final product.

The known matrix used for the manufacture of optically readable information carriers is a nickel matrix. The manufacture thereof there is started from a master disc. The master is a glass plate which is provided on one side with a photoresist layer in which an information track is provided by exposure to light and development. On the side provided by the photoresist layer, comprising the information track, the master is provided with an electrolessly, evaporated or sputtered metal layer, for example, an Ag layer. On this metal layer an Ni peel is grown by electrodeposition forming the so-called father disc. The master is removed and Ni copies, the so-called mother discs, are made from the resulting father disc by electrodeposition.

From the mother discs Ni copies are made, the so-called dies, which are used in the above-mentioned injection molding process or compression molding process.

The disadvantage of the above-mentioned method is that in the manufacture of the father disc the master disc is lost. Hence only one Ni father disc can be manufactured from the master. This is a serious disadvantage in view of the high cost-price of the master. The above-described process for the manufacture of an Ni matrix is also time-consuming and comprises a series of process steps each of which gives rise to the occurrence of defects. Moreover, each Ni peel manufactured by electrodeposition must be polished. Loss of quality and/or a comparatively high reject percentage is the result.

SUMMARY OF THE INVENTION

It is the object of the invention to provide a matrix which can be manufactured in a simple manner. A more particular object of the invention is to provide a matrix which is derived directly from a master disc without the use of intermediate steps. As a result, the master disc is not lost. Several, for example, 50 matrices according to the invention can be manufactured from one master disc.

According to the invention this object is achieved by means of a matrix of the type mentioned in the opening paragraph which is characterized in that the matrix comprises a metal supporting plate a surface of which is provided with a layer of a radiation-cured synthetic resin composition the surface of which layer away from the plate comprises the negative of the information track.

The matrix is manufactured by providing the master disc, on the side of the photoresist layer, with a thin metal layer. The metal layer incorporates the information track present in the photoresist layer. A layer of a liquid, uncured, synthetic resin composition provided on a surface of the metal supporting plate is pressed against the metal layer of the master. The layer formed of the synthetic resin composition is cured by radiation and the supporting plate together with the cured synthetic resin layer bonded thereto and in which the information track of the master is copied is removed from the master disc. The master disc remains intact.

DETAILED DESCRIPTION OF THE INVENTION

Figure 1:
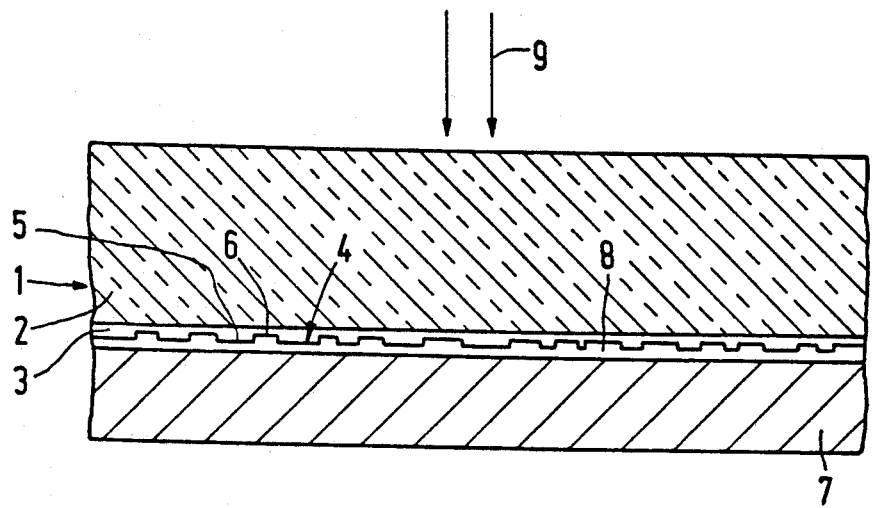
FIG. 1 is a cross-sectional view of a master disc and a matrix of the invention during the manufacture of the matrix.

In an injection molding process or a compression molding process the thermal control in the mold plays an important part. This applies in particular if products are to be manufactured which have a very fine structure, for example, the extremely refined structure of an optically readable information track. The matrix has a strong influence on the thermal control. Of particular importance is the nature of the matrix material and the thicknesses of the composing layers forming the matrix. Good results are achieved in particular by means of a matrix according to the invention, the supporting plate of which is manufactured from stainless steel, nickel or a hard aluminum alloy having a thickness of at least 200 μm. An example of a hard aluminum alloy is an alloy of Al and Mg.

In a suitable further favorable embodiment a supporting plate is used which is manufactured from stainless steel and comprises a layer of Al or Ni on the side of the plate provided with the cured synthetic resin composition. The layer of Al or Ni has a thickness of, for example, layer a few microns. By using such a layer the bonding between the supporting plate and the synthetic resin composition is improved in particular when the stainless steel supporting layer plate has a very smooth surface. If desired, a bonding layer of, for example, a silane may be provided between supporting plate and the synthetic resin composition layer. A suitable silane is gamma-methacryloxy propyltrimethoxy silane. This silane compound is cured together with the synthetic resin composition layer.

When the matrix is used in an injection molding process or a compression molding process, the layer of cured synthetic resin composition contacts the hot injected synthetic resin. In the case of polymethylmethacrylate, for example, the injection molding temperature is 275° C. In the case of polycarbonate it is 350° C. Hence higher requirements are imposed upon the synthetic resin composition as regards hardness in connection with the occurring high pressures, the non-deformability and the temperature resistance. Moreover, the cured synthetic resin layer influences the cooling rate in the mold.

Favorable results are achieved by means of a matrix the metal supporting plate of which comprises on one side a layer of a UV-light cured synthetic resin composition containing 30-80% by weight of urethane acrylate. The thickness of the cured synthetic resin composition is preferably from 10 to 30 μm.

In a preferred of the matrix according to the invention the metal supporting plate on one side comprises a UV light-cured synthetic resin composition containing 25-65% by weight of an aromatic urethane acrylate, 5-15% by weight of an aliphatic urethane acrylate, 2-8% by weight of catalyst and 15-65% by weight of monomers.

A suitable aromatic urethane acrylate is known under the tradename of Ebecryl 220. A suitable aliphatic urethane acrylate is known under the tradename of Ebecryl 230.

A suitable catalyst is, for example, an aromatic carbonyl compound, for example, benzoin isobutyl ether or a ketal, for example, benzil dimethyl ketal. The UV light-curable monomer compounds are preferably mono-, di- and/or trifunctional compounds comprising one, two or three vinyl groups, respectively, per molecule. An example of a monofunctional compound is N-vinylpyrrolidone or a monoacrylate, for example hexyl acrylate. An example of a difunctional compound is a diacrylate, for example hexanediol diacrylate. A suitable trifunctional compound is a triacrylate, for example trimethylol propane triacrylate.

A few thousand information carriers can be manufactured by means of each matrix. When the matrix according to the invention is used the information track of the information carriers a better quality of is obtained as compared with the known Ni matrix.

In another favorable embodiment the layer of the cured synthetic resin composition at its free surface is coated with a metal layer having a thickness of 10-60 nm.

A suitable metal layer is a Cr or Al layer which is provided on the cured synthetic resin composition by means of a vapor deposition process or a sputtering process.

The invention will now be described in greater detail with reference to the following specific examples and the drawing.

EXAMPLE I

Reference numeral 1 in FIG. 1 denotes a master disc. The master disc comprises a glass plate 2 having a diameter of approximately 30 cm and a thickness of 5 mm and is provided on one side with a layer 3 of a positive photoresist which has been exposed to light and developed and comprises an information track 4. Track 4 has a crenelated profile of information areas 5 and information areas 6 situated alternately at a higher level and at a lower level. The difference in height between the areas is 0.1-0.2 μm. the longitudinal dimensions vary in accordance with the stored information from approximately 0.3 to 3 μm. The layer 3 of photoresist is covered with a very thin metal layer, not shown, in a thickness of, for example, 10-40 nm for example 25 nm.

A metal supporting plate 7 which on the side facing the master 1 comprises a layer 8 of a liquid, UV light-curable, synthetic resin composition is pressed against the metal layer of the master 1. The metal supporting plate is manufactured, for example, from an Al/Mg alloy and has a thickness of 300 μm. The supporting plate may alternatively be manufactured from Ni or stainless steel. If a stainless steel supporting plate is used it is preferred to provide a bonding layer of an epoxy resin between the supporting plate and the UV light curable synthetic resin composition. Preferably the epoxy resin bonding layer is UV light curable and has a thickness of about 6-7 μm. Alternatively it is preferred to slightly roughen the surface of the plate facing the synthetic resin composition or to provide it with a thin layer of Al or Ni of a thickness of a few microns. It is also preferred to provide a bonding layer of a silane, in particular a monolayer of γ-methacryloxypropyl trimethoxy silane, which copolymerizes under the influence of radiation, between the supporting plate and the light-curable synthetic resin composition. The thickness of the layer 8 of the synthetic resin composition is 10-30 μm, in particular 20 μm.

A few synthetic resin compositions that may be employed as well as the properties thereof are listed in the table below.

|  | Synthetic resin composition I in % | Synthetic resin composition II in % | Synthetic resin composition III in % |
| --- | --- | --- | --- |
| Ingredients |  |  |  |
| Trimethylol propane triacrylate | 20 | 28.5 | 31.5 |
| N-vinylpyrrolidone | 10 | 19.0 | 10.5 |
| Catalyst | 5 | 4.8 | 5.3 |
| Aromatic urethane acrylate | 55 | 38.2 | 42.2 |
| Aliphatic urethane acrylate | 10 | 9.5 | 10.5 |
| Properties |  |  |  |
| Halflife exposure time (sec) | 7.2 | 7.3 | 6.4 |
| Shrinkage (%) | 12.2 | 13.0 | 13.7 |
| Penetration hardness (μm) | 1.27 | 1.51 | 1.44 |
| Viscosity (mPa · s) | 1994 | 994 | 354 |

The half-life exposure time is the time in which 50% of the final shrinkage is achieved.

Figure 2:
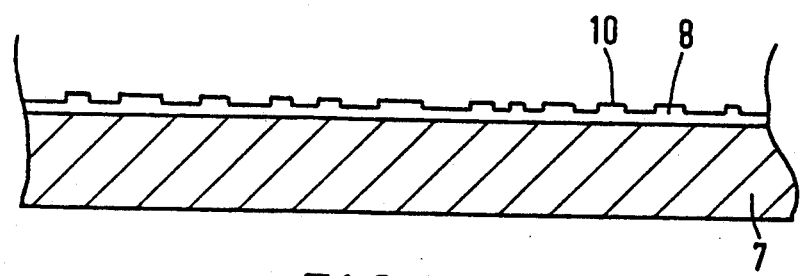
FIG. 2 is a cross-sectional view of a matrix of the invention.

The synthetic resin composition as described hereinbefore is exposed to UV light 9 via the master. The exposure time is 15 seconds or more. As a result of the exposure the synthetic resin composition is cured (cross-linked). The optional bonding layer of γ-methacryloxy propyl trimethoxy silane also crosslinks together with the synthetic resin composition. The metal supporting plate together with cured synthetic resin composition bonded thereto and in which the negative of the information track of the master disc is formed is removed from the master disc. The master disc is not damaged and may be used again for the manufacture of a matrix as described hereinbefore. It has been found in practice that approximately 50 matrices can be manufactured from one master disc. The resulting matrix (FIG. 2) is suitable for use as a die in an injection molding process or a compression molding process. For this purpose, the die is placed in the conventional mold and the a liquid synthetic resin, for example polymethylmethacrylate or polycarbonate, is then pressed at elevated pressure in the mold according to the conventional technique of an injection molding process or a compression molding process. In this manner at least 2500 synthetic resin replicas can be manufactured from one die. The quality of the information track of the synthetic resin replicas is excellent and is considerably better than when a matrix is used which is manufactured entirely from Ni. The information track of the matrix according to the invention is more accurately copied in the synthetic resin replica. The signal-to-noise ratio of the information track in the synthetic resin replica is improved by a few dB. The matrix, before being used in an injection molding process or a compressing molding process, may also be provided on the side of the cured synthetic resin composition with a metal layer 10 of, for example, Cr or Al in a thickness of 10-60 nm. Such a layer can be provided on the cured synthetic resin composition by a vapor deposition process or a sputtering process.

EXAMPLE II

Figure 3:
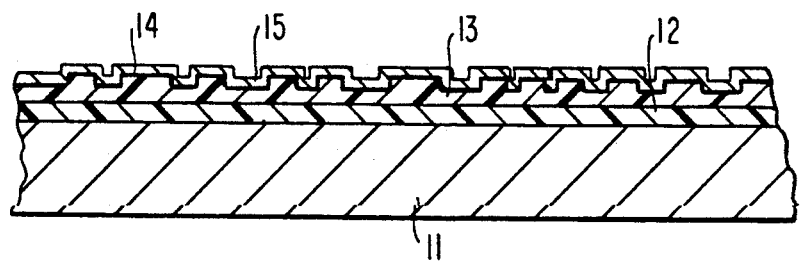
FIG. 3 is a cross-sectional view of an additional matrix of the invention.

The production of an additional preferred matrix of the invention will now be described with reference to FIG. 3 of the drawing.

A surface of a disc-shaped stainless steel supporting plate 11 having a thickness of 0.3 mm and a diameter of 137.8 mm was provided with a 6-7 μm thick primer coating 12 of a UV light-curable epoxy resin.

A 13-14 μm thick coating 13 of a U.V. light-curable composition was applied to the primer coating 12.

The primer coating 12 was formed of a mixture of cycloalphatic epoxies containing about 4% by weight of a triarylsulfonium hexafluoroantimonate as a photoinitiator.

The U.V. light curable coating 13 was formed of the following composition.

| | |
|---|---|
| hexanedioldiacrylate | 32 wt. % |
| N-vinylpyrrolidone | 19 wt. % |
| aromatic urethane acrylate | 36 wt. % |
| aliphatic urethane acrylate | 9 wt. % |
| initiator (Irgacure) | 4 wt. % |

An optically readable information track 14 (similar in structure to information track 4) was then provided on the surface of coating 13. Coatings 12 and 13 were then cured by exposure to U.V.-light.

A 30 nm thick layer 15 of Al was then applied to the surface of the coating 13 provided with the information track 14.

The resultant matrix was then employed as a die in an injection molding process for molding synthetic resin information discs from polycarbonate.

Even after the production of 2000 discs, the discs produced from the matrix were of good quality and no deformation of the matrix was observed.

What is claimed is:

1. A matrix suitable for use in an injection molding process or a compression molding process for the manufacture of optically readable information carriers which carriers comprise an optically readable information track, said matrix comprising a stainless steel supporting plate of a thickness of at least 200 μm, and which plate is provided with an epoxy resin bonding layer and which bonding layer is provided with a layer of a radiation-cured synthetic resin composition, which layer of synthetic resin comprises, in a surface away from the supporting plate, an information track which is the negative of said optically readable information track.

2. The matrix of claim 1 wherein the epoxy resin bonding layer is UV light-cured.

3. The matrix of claim 2 wherein the epoxy resin bonding layer has a thickness of 6-7 μm.

4. The matrix of claim 2 wherein the epoxy bonding layer is formed from a mixture of cycloaliphatic epoxy resins.

5. The matrix of claim 2 wherein the layer of the radiation-cured synthetic resin composition comprises, at its outer surface having the information track, a metal layer of a thickness of 10-60 nm.

* * * * *